United States Patent
Yamamoto

(10) Patent No.: US 11,931,680 B2
(45) Date of Patent: Mar. 19, 2024

(54) AIR FILTER DEVICE OF INDUSTRIAL MACHINE

(71) Applicant: FANUC CORPORATION, Yamanashi (JP)

(72) Inventor: Kazuhiro Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 654 days.

(21) Appl. No.: 16/835,373

(22) Filed: Mar. 31, 2020

(65) Prior Publication Data
US 2020/0338491 A1 Oct. 29, 2020

(30) Foreign Application Priority Data
Apr. 23, 2019 (JP) .................................. 2019-082049

(51) Int. Cl.
*B01D 46/00* (2022.01)
*B01D 46/22* (2006.01)
(Continued)

(52) U.S. Cl.
CPC ......... *B01D 46/22* (2013.01); *B01D 46/0086* (2013.01); *B01D 46/442* (2013.01); *B01D 46/69* (2022.01); *B01D 46/79* (2022.01)

(58) Field of Classification Search
CPC ........ B01D 46/22; B01D 46/79; B01D 46/69; B01D 46/0086; B01D 46/442; A47K 2010/3226
(Continued)

(56) References Cited

U.S. PATENT DOCUMENTS 3,902,455 A * 9/1975 Lehmann ................ B05B 16/90
55/354
4,294,596 A * 10/1981 Taverez .................. B01D 46/22
55/296
(Continued)

FOREIGN PATENT DOCUMENTS

CN 101321547 A 12/2008
CN 102243418 A 11/2011
(Continued)

OTHER PUBLICATIONS

An Office Action; "Notice of Reasons for Refusal," mailed by the Japanese Patent Office dated Aug. 31, 2021, which corresponds to Japanese Patent Application No. 2019-082049 and is related to U.S. Appl. No. 16/835,373 with English translation.

*Primary Examiner* — T. Bennett McKenzie
(74) *Attorney, Agent, or Firm* — Studebaker & Brackett PC

(57) ABSTRACT

An air filter device of an industrial machine in which an air filter is arranged in a filtered portion of the industrial machine is provided, the air filter device includes: a first operation unit which transports the long air filter toward the filtered portion; a second operation unit which collects the air filter transported from the first operation unit and used in the filtered portion; and a control unit which controls the drive of the first operation unit and the second operation unit and the control unit includes a first determination unit which determines whether or not the air filter in the first operation unit is about to run out or runs out, and outputs, when the first determination unit determines that the air filter is about to run out or runs out, a signal indicating that the air filter needs to be replaced.

5 Claims, 13 Drawing Sheets

(51) Int. Cl.
    *B01D 46/44*      (2006.01)
    *B01D 46/69*      (2022.01)
    *B01D 46/79*      (2022.01)

(58) Field of Classification Search
    USPC ...... 55/282–305, 351–354; 95/231; 340/675; 702/128
    See application file for complete search history.

(56) References Cited

U.S. PATENT DOCUMENTS

| | | | | |
|---|---|---|---|---|
| 4,435,909 | A | * | 3/1984 | Williamson, Jr. .... F26B 25/007 55/352 |
| 4,620,184 | A | * | 10/1986 | Nedstedt ............... B65H 26/08 226/11 |
| 5,217,514 | A | * | 6/1993 | Grafen .................. D06B 23/20 55/351 |
| 5,391,218 | A | * | 2/1995 | Jorgenson .......... B01D 46/0086 95/20 |
| 6,402,822 | B1 | * | 6/2002 | Najm .................. B01D 46/446 96/429 |
| 2003/0131571 | A1 | * | 7/2003 | Demarco ............... B01D 45/16 55/324 |
| 2008/0283220 | A1 | * | 11/2008 | Martin ..................... F01P 11/12 165/95 |
| 2010/0077926 | A1 | * | 4/2010 | Yamagishi ............... B03C 3/64 96/423 |
| 2014/0237763 | A1 | * | 8/2014 | Holsten ..................... A47L 9/20 96/417 |
| 2014/0338293 | A1 | * | 11/2014 | Williams ............... B01D 35/12 55/482 |
| 2016/0187484 | A1 | * | 6/2016 | Bloomfield ........ B65H 23/1955 250/341.8 |

FOREIGN PATENT DOCUMENTS

| | | | |
|---|---|---|---|
| CN | 105042829 A | | 11/2015 |
| JP | H07-098148 A | | 4/1995 |
| JP | H0798148 A | * | 4/1995 ............. F24F 13/28 |
| JP | H07-238427 A | | 9/1995 |
| JP | H10-232068 A | | 9/1998 |
| JP | 2012-066190 A | | 4/2012 |
| JP | 2019018130 A | | 2/2019 |

* cited by examiner

AIR FILTER DEVICE OF INDUSTRIAL MACHINE

This application is based on and claims the benefit of priority from Japanese Patent Application No. 2019-82049, filed on 23 Apr. 2019, the content of which is incorporated herein by reference.

BACKGROUND OF THE INVENTION

Field of the Invention

The present invention relates to an air filter device of an industrial machine.

Related Art

Motors which are used in various industrial machines such as a machine tool, an industrial robot and an injection molding machine are generally controlled by a motor drive device installed within a power magnetics cabinet. Since the motor drive device generates heat when operated, a heat dissipator and a fan motor for cooling the heat dissipator are installed outside the power magnetics cabinet (outside the installation room of the industrial machine) so as to protrude. The heat dissipator and the fan motor are covered with a cover which includes an inlet and an outlet. In the inlet and the outlet, air filters for preventing dirt from being adhered to the heat dissipator and the fan motor are installed.

Since the air filters are dirty and thus the efficiency of intake and exhaust is lowered, it is necessary to replace the air filters at regular intervals. However, an operation for replacing the air filters provided in the inlet and the outlet one by one is significantly complicated, and thus it is likely that the replacement operation is not performed and that the installation of the air filters itself is stopped. Consequently, the air filters are dirty, and thus the efficiency of cooling with the heat dissipator and the fan motor is lowered.

Conventionally, it is known that when in a dust collector which includes a filter for filtering dust generated in a laser machining device, a pressure difference between a dust collection chamber and a suction chamber partitioned with the filter is equal to or greater than a preset threshold value, high pressure air is jetted from the side of the suction chamber to the side of the dust collection chamber, and thus dust adhered to the filter is removed off (see, for example, patent document 1).

Patent Document 1: Japanese Unexamined Patent Application, Publication No. 2019-18130

SUMMARY OF THE INVENTION

As in the conventional technology described above, the high pressure air is jetted to the air filter so as to remove dirt, and thus it is possible to restore the performance of the filter. However, it is difficult to completely remove the dirt adhered to the air filter, the same air filter is continuously used and thus the dirt which is left without being removed is gradually deposited. Consequently, it is likely that the performance of the filter is gradually lowered as time passes, that cooling performance with a heat dissipator and a fan motor is lowered and that thus the function of a motor drive device is lowered. Hence, in an industrial machine, it is desired that the constant performance of a filter can be maintained over a long period of time.

One aspect of an air filter device of an industrial machine according to the present disclosure is an air filter device of an industrial machine in which an air filter is arranged in a filtered portion of the industrial machine, the air filter device includes: a first operation unit which transports the long air filter toward the filtered portion; a second operation unit which collects the air filter transported from the first operation unit and used in the filtered portion; and a control unit which controls the drive of the first operation unit and the second operation unit and the control unit includes a first determination unit which determines whether or not the air filter capable of being utilized in the first operation unit is about to run out or runs out, and outputs, when the first determination unit determines that the air filter capable of being utilized is about to run out or runs out, a signal indicating that the air filter needs to be replaced.

Another one aspect of the air filter device of the industrial machine according to the present disclosure is an air filter device of an industrial machine in which an air filter is arranged in a filtered portion of the industrial machine, the air filter device includes: a first operation unit which transports the long air filter toward the filtered portion; a second operation unit which collects the air filter transported from the first operation unit and used in the filtered portion; a control unit which controls the drive of the first operation unit and the second operation unit; and a dirt removal unit which removes dirt adhered to the used air filter.

In the air filter device of the industrial machine of the one aspect, it is possible to maintain the constant performance of the filter over a long period of time, and when the air filter capable of being utilized is about to run out or runs out, it is possible to find the necessity of replacement of the air filter by the output of the signal from the control unit.

In the air filter device of the industrial machine of the other one aspect, it is possible to maintain the constant performance of the filter over a long period of time, and it is also possible to reuse the used air filter.

DETAILED DESCRIPTION OF THE INVENTION

Figure 1:
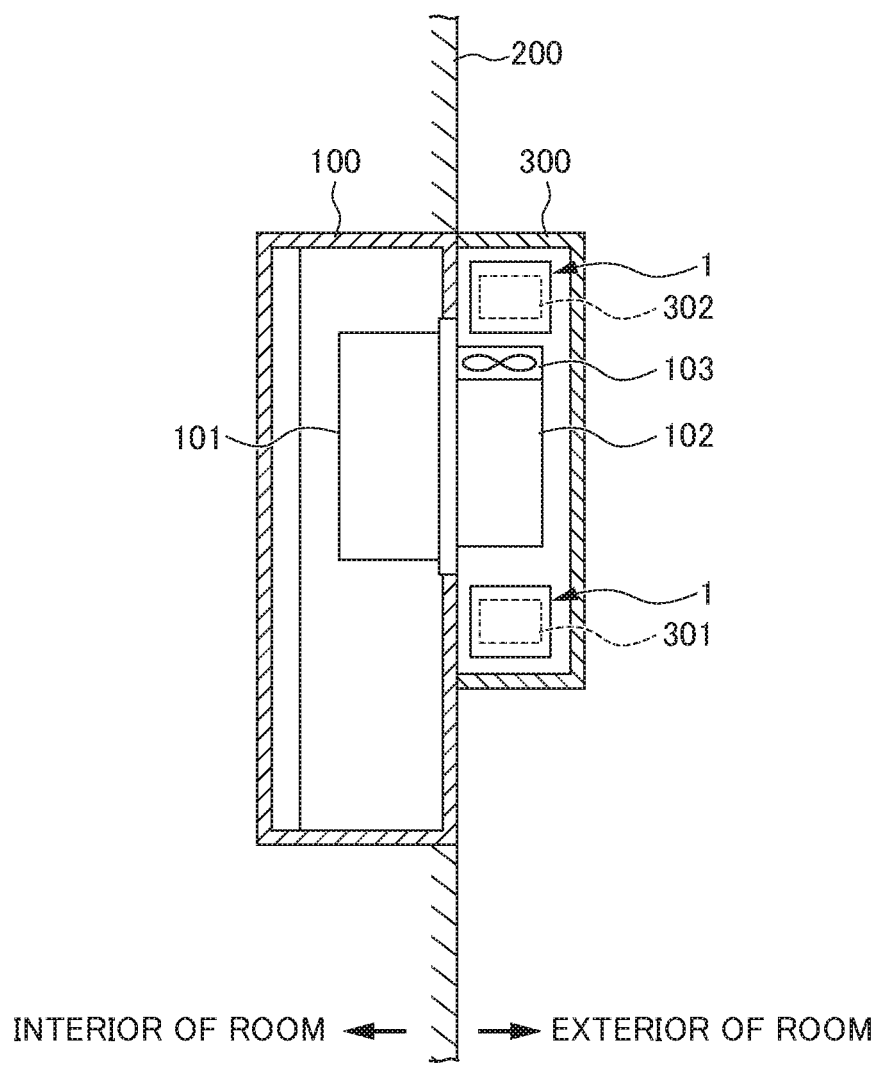
FIG. 1 is a diagram showing the internal structure of an embodiment of a power magnetics cabinet to which an air filter device of an industrial machine is applied.

An embodiment of an air filter device of an industrial machine according to the present disclosure will be described in detail below with reference to drawings. FIG. 1 is a diagram showing the internal structure of an embodiment of a power magnetics cabinet to which the air filter device of the industrial machine is applied. The power magnetics cabinet 100 described in the present embodiment is installed so as to straddle between the interior and exterior of a room in which the industrial machine is installed. There is no limitation to the specific industrial machine, and examples thereof include an industrial machine such as a laser machining device, an industrial robot, an injection molding machine and the like. The power magnetics cabinet 100 is provided in a side wall portion 200 of the interior of the room in which the industrial machine is installed. Within the power magnetics cabinet 100, a motor drive device 101 for controlling the drive of a motor used in the industrial machine is equipped.

In the motor drive device 101, a heat dissipator 102 and a fan motor 103 for cooling the heat dissipator 102 are provided. The heat dissipator 102 and the fan motor 103 are protruded from the side wall portion 200 toward the exterior of the room, and are covered with a cover 300 in the exterior of the room.

In the side surface of a lower portion of the cover 300, an inlet 301 which takes air into the cover 300 is provided, and in the side surface of an upper portion of the cover 300, an outlet 302 which discharges air within the cover 300 is provided. In the present embodiment, each of the inlet 301 and the outlet 302 is a filtered portion in which the air filter is arranged. The air filter device 1 is provided in each of the inlet 301 and the outlet 302 inside the cover 300.

Specific embodiments of the air filter device 1 will then be described. Since the configuration of the air filter device 1 is the same both in the inlet 301 and the outlet 302, in the following description of the air filter device 1, the inlet 301 and the outlet 302 may also be referred to as the "inlet/outlet 301, 302". In the drawings described below, parts of the same configurations are identified with the same reference numerals, and repeated description will be omitted.

Figure 2:
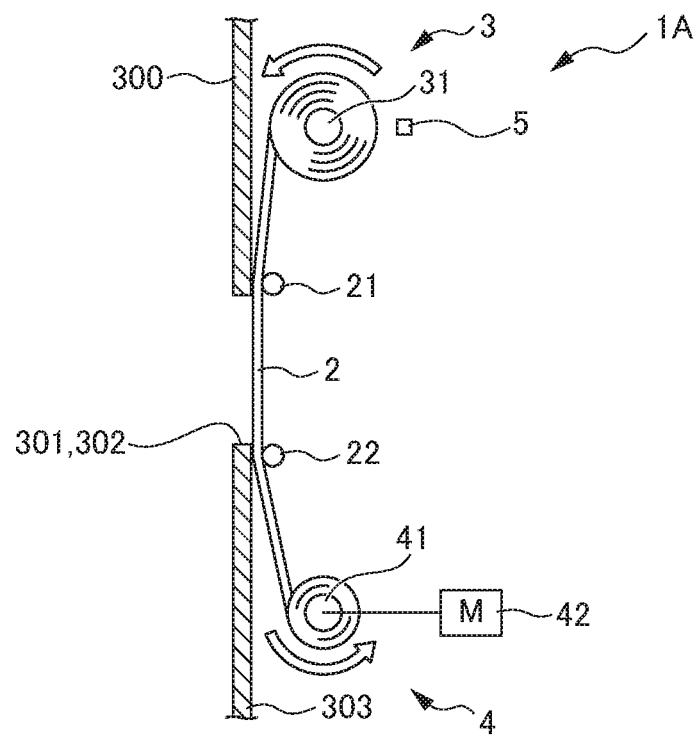
FIG. 2 is a diagram showing an embodiment of an air filter device of an industrial machine.
Figure 3:
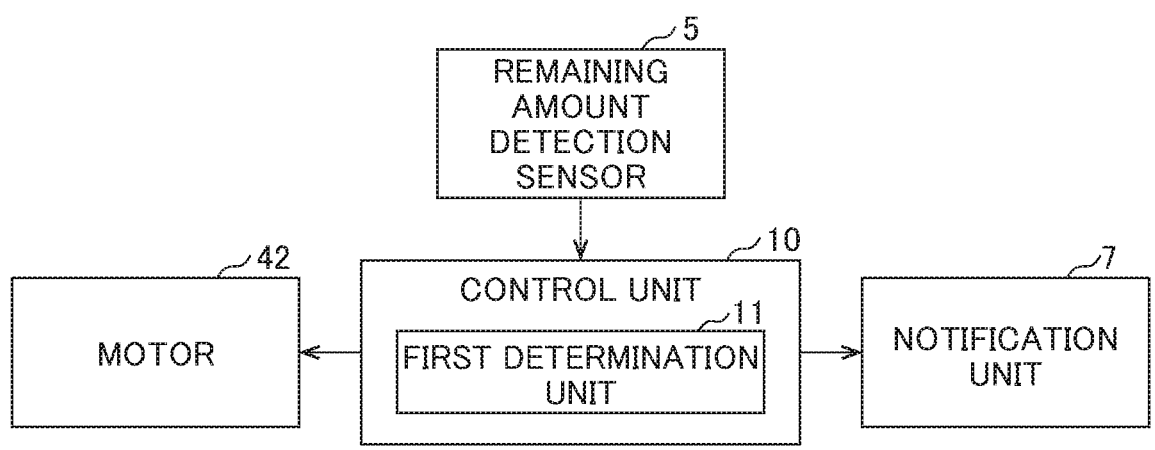
FIG. 3 is a block diagram showing the configuration of the air filter device of the industrial machine shown in FIG. 2.

FIG. 2 is a diagram showing an embodiment of the air filter device of the industrial machine. FIG. 3 is a block diagram showing the configuration of the air filter device of the industrial machine shown in FIG. 2. As shown in FIGS. 2 and 3, the air filter device 1A of the present embodiment includes an air filter 2, a first operation unit 3, a second operation unit 4, a remaining amount detection sensor 5, a notification unit 7 and a control unit 10.

The first operation unit 3 and the second operation unit 4 are arranged through the inlet/outlet 301, 302. The first operation unit 3 includes a rotation axis 31 which is rotatably provided. The second operation unit 4 includes a rotation axis 41 which is rotatably provided. The rotation axis 31 and the rotation axis 41 are arranged substantially parallel to each other. The second operation unit 4 further includes a motor 42. The rotation axis 41 of the second operation unit 4 can be rotated by the rotation drive of the motor 42 in a counterclockwise direction in FIG. 2.

The air filter 2 is formed in the shape of a long strip, and is wound around the rotation axis 31 of the first operation unit 3 in the shape of a roll. In the present embodiment, the air filter 2 which is wound around the rotation axis 31 of the first operation unit 3 is an unused air filter before being used in the inlet/outlet 301, 302. The rotation axis 41 of the second operation unit 4 is rotated by the rotation drive of the motor 42 so as to wind the air filter 2 in the shape of a roll. In the present embodiment, the air filter 2 which is wound around the rotation axis 41 of the second operation unit 4 is the used air filter after being used in the inlet/outlet 301, 302.

A pair of stretch rollers 21 and 22 are arranged substantially parallel to the rotation axes 31 and 41 between the first operation unit 3 and second operation unit 4 so that the inlet/outlet 301, 302 are sandwiched. The stretch rollers 21 and 22 are arranged close to the inside surface 303 of the cover 300. The air filter 2 which is wound around the rotation axis 31 of the first operation unit 3 is extended to the rotation axis 41 of the second operation unit 4 through the inside surface 303 of the cover 300 and an area between the stretch rollers 21 and 22. In this way, the air filter 2 is stretched flat between the stretch rollers 21 and 22, and is arranged so as to cover the inlet/outlet 301, 302 from inside the cover 300.

The remaining amount detection sensor 5 is arranged in the first operation unit 3. The remaining amount detection sensor 5 detects the remaining amount of air filter 2 which is wound around the rotation axis 31 of the first operation unit 3. The remaining amount detection sensor 5 detects that the air filter 2 which is wound around the rotation axis 31 completely runs out or that the air filter 2 which is wound around the rotation axis 31 is about to run out.

The remaining amount detection sensor 5 can be used without limitation as long as the remaining amount detection sensor 5 can detect the remaining amount of air filter 2 in the first operation unit 3. Specific examples of the configuration thereof include a configuration in which a distance between the remaining amount detection sensor 5 and the surface of the air filter 2 wound around the rotation axis 31 is detected in a contact or non-contact manner, a configuration in which an appropriate mark is provided in a terminal of the air filter 2 wound around the rotation axis 31 or in the vicinity of the terminal and in which the mark is detected with the remaining amount detection sensor 5 in a contact or non-contact manner, a configuration in which a variation in the rotation speed of the rotation axis 31 caused by a variation in the remaining amount of air filter 2 is detected and the like. As shown in FIG. 3, a detection signal generated with the remaining amount detection sensor 5 is fed to the control unit 10.

The notification unit 7 receives an output of the signal from the control unit 10 so as to notify an operator of the necessity of replacement of the air filter 2 and other information. There is also no limitation to the specific configuration of the notification unit 7, and in general, the notification unit 7 can be configured by at least one type of a display on a monitor screen, the sound and movement of a buzzer and the flashing of a lamp.

The control unit 10 controls the rotation drive of the motor 42 in the second operation unit 4. In the air filter device 1A of the present embodiment, the rotation axis 41 of the second operation unit 4 is rotated by the rotation drive of the motor 42 in the counterclockwise direction so as to wind and collect the air filter 2 which is wound around the rotation axis 31 of the first operation unit 3. In this way, the rotation axis 31 of the first operation unit 3 follows the rotation in the counterclockwise direction so as to rotate, and thus a new unused air filter 2 is transported toward the inlet/outlet 301, 302. In other words, the first operation unit 3 of the present embodiment functions as a supply means for supplying the unused air filter 2 to the inlet/outlet 301, 302, and the second operation unit 4 functions as a collection means for collecting the used air filter 2 after being used in the inlet/outlet 301, 302. The air filter 2 which is newly supplied to the inlet/outlet 301, 302 is used in order to cover the inlet/outlet 301, 302 and to thereby prevent the entry of dust and dirt from the inlet/outlet 301, 302.

The air filter 2 is transported continuously or intermittently (regularly). When the air filter 2 is continuously transported, for example, during the operation of the industrial machine, the air filter 2 is continuously transported from the first operation unit 3 to the inlet/outlet 301, 302 at a slow speed. In this way, the inlet/outlet 301, 302 is constantly covered with the unused air filter 2 which is supplied continuously. When the air filter 2 is continuously (regularly) transported, for example, each time a fixed time elapses after the operation of the industrial machine (for example, every one hour), the air filter 2 is transported only a predetermined distance (for example, a distance over which the entire air filter 2 covering inlet/outlet 301, 302 can be replaced with the new unused air filter 2). In this way, the inlet/outlet 301, 302 is automatically replaced with the new unused air filter 2 with timing at which the air filter 2 is made dirty.

As shown in FIG. 3, the control unit 10 includes a first determination unit 11. By whether or not the detection signal from the remaining amount detection sensor 5 is input, the first determination unit 11 determines whether the unused air filter 2 in the first operation unit 3 is about to run out or runs out. When the first determination unit 11 determines that the unused air filter 2 in the first operation unit 3 is about to run out or runs out, the control unit 10 outputs, to the notification unit 7, a signal for notifying the necessity of replacement of the air filter. When the notification unit 7 receives the output of the signal from the control unit 10, the notification unit 7 notifies the operator of the necessity of replacement of the air filter 2.

In the air filter device 1A of the present embodiment, the new unused air filter 2 can be supplied from the first operation unit 3 to the inlet/outlet 301, 302, and thus it is possible to maintain the constant performance of the filter over a long period of time without need to take, for example, time and effort to remove the dirty air filter. Consequently, the efficiency of cooling is maintained, the entry of dirt is prevented and thus the reliability of the motor drive device 101 is enhanced. When the air filter 2 of the first operation unit 3 is about to run out or runs out, the signal for notifying the necessity of replacement of the air filter 2 is output from the control unit 10, and thus based on this signal, with the notification unit 7, notification can be provided to the operator, with the result that it is possible to reduce the duration of a state where the air filter runs out.

The first operation unit 3 which includes the unused air filter 2 and the second operation unit 4 which is driven with the drive source (motor) so as to collect the used air filter 2 may be arranged upside down in FIG. 2. In other words, the first operation unit 3 may be arranged in the lower side of FIG. 2, and the second operation unit 4 may be arranged in the upper side of FIG. 2. In this case, the rotation axis 41 of the second operation unit 4 is rotated with the motor 42 in a clockwise direction, and thus the used air filter 2 is collected, and the rotation axis 31 of the first operation unit 3 follows the rotation of the rotation axis 41 in the second operation unit 4 so as to rotate in the clockwise direction, with the result that the unused air filter 2 is supplied to the inlet/outlet 301, 302.

Figure 4:
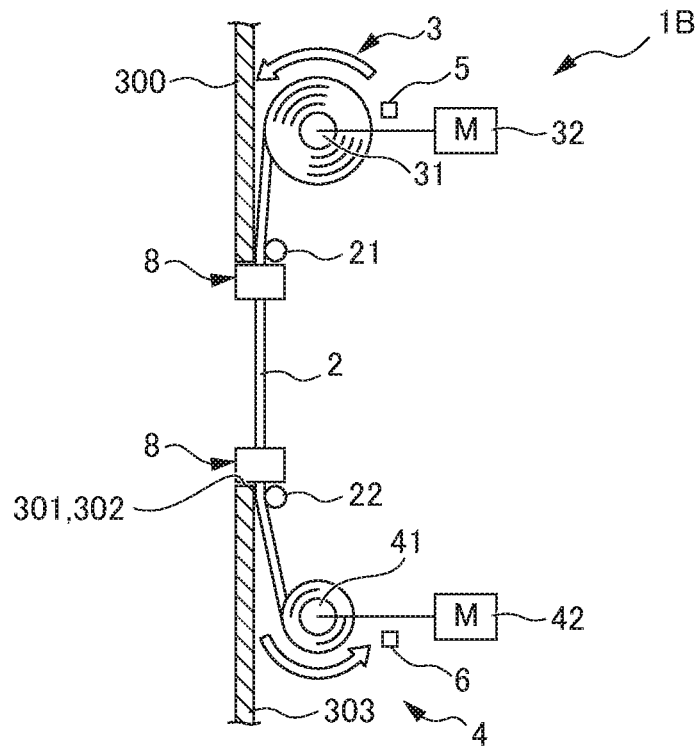
FIG. 4 is a diagram showing another embodiment of the air filter device of the industrial machine.
Figure 5:
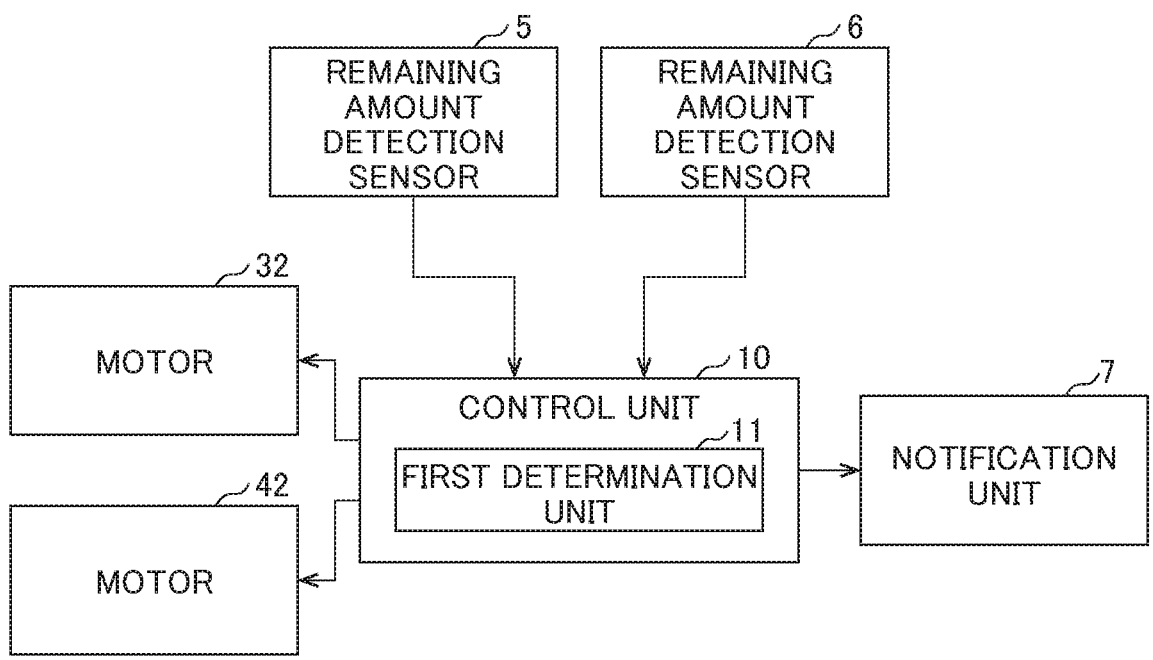
FIG. 5 is a block diagram showing an example of the configuration of the air filter device of the industrial machine shown in FIG. 4.
Figure 6:
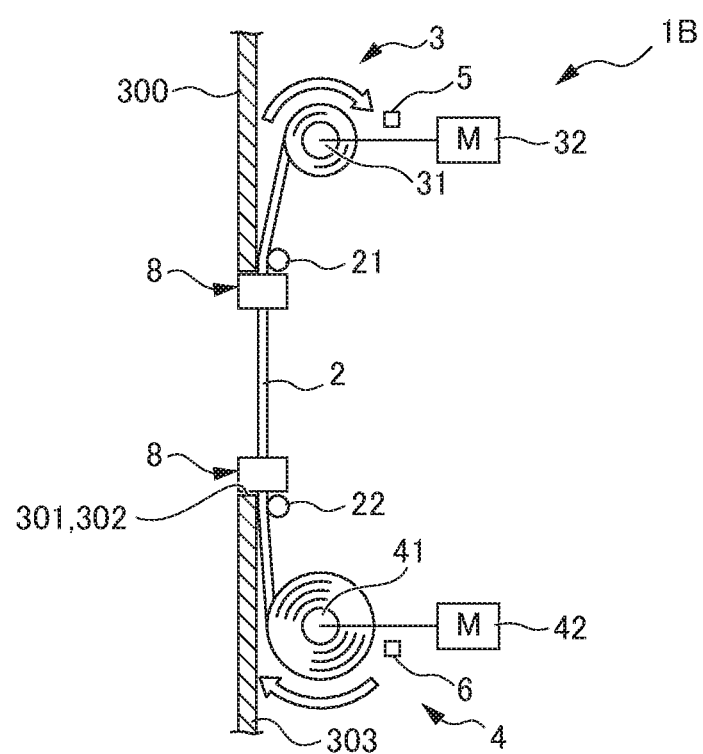
FIG. 6 is a diagram showing another operation state of the air filter device of the industrial machine shown in FIG. 4.

FIG. 4 is a diagram showing another embodiment of the air filter device of the industrial machine. FIG. 5 is a block diagram showing an example of the configuration of the air filter device of the industrial machine shown in FIG. 4. FIG. 6 is a diagram showing another operation state of the air filter device of the industrial machine shown in FIG. 4. The air filter device 1B of the present embodiment differs from the air filter device 1A shown in FIG. 2 in that a motor 32 is also provided in the first operation unit 3, that a remaining amount detection sensor 6 is also arranged in the second operation unit 4 and that dirt removal units 8 are provided.

The rotation drive of the motor 32 in the first operation unit 3 is controlled by the control unit 10 as with the motor 42 in the second operation unit 4. In the present embodiment, when the motor 32 of the first operation unit 3 is not driven to rotate, and the motor 42 of the second operation unit 4 is driven to rotate, as shown in FIG. 4, the rotation axis 31 of the first operation unit 3 follows the operation of winding the air filter 2 with the rotation axis 41 of the second operation unit 4 so as to rotate in the counterclockwise direction. In this way, the air filter 2 is transported from the first operation unit 3 toward the inlet/outlet 301, 302. The air filter 2 after being used in the inlet/outlet 301, 302 is wound around the rotation axis 41 of the second operation unit 4 so as to be collected.

On the other hand, when the motor 32 of the first operation unit 3 is driven to rotate, and the motor 42 of the second operation unit 4 is not driven to rotate, as shown in FIG. 6, the rotation axis 31 of the first operation unit 3 is rotated in the clockwise direction. In this way, the air filter 2 is transported from the second operation unit 4 toward the inlet/outlet 301, 302. The air filter 2 after being used by covering the inlet/outlet 301, 302 is wound around the rotation axis 31 of the first operation unit 3 so as to be collected.

Hence, in the air filter device 1B, the first operation unit 3 functions as the supply means for supplying the air filter 2 to the inlet/outlet 301, 302 (in the case of FIG. 4), and also functions as the collection means for the used air filter 2 (in the case of FIG. 6). The second operation unit 4 functions as the collection means for the used air filter 2 (in the case of FIG. 4), and also functions as a supply means for supplying again the used air filter 2 to the inlet/outlet 301, 302. Even in the present embodiment, the transport of the air filter 2 is performed continuously or intermittently (regularly).

As the remaining amount detection sensor 6, a sensor which has the same configuration as the remaining amount detection sensor 5 can be used. The remaining amount detection sensor 6 also detects that the air filter 2 which is wound around the rotation axis 41 completely runs out or is about to run out. As shown in FIG. 5, a detection signal generated with the remaining amount detection sensor 6 is also fed to the control unit 10.

The dirt removal unit 8 removes, partway through the transport of the air filter 2, dirt adhered to the used air filter 2 which has been used in the inlet/outlet 301, 302. The dirt removal unit 8 is arranged on each of the transport path of the air filter 2 between the first operation unit 3 and the inlet/outlet 301, 302 and the transport path of the air filter 2 between the second operation unit 4 and the inlet/outlet 301, 302. In the air filter device 1B described in the present embodiment, one dirt removal unit 8 is arranged in the vicinity of the stretch roller 21 on the side of the first operation unit 3, and the other dirt removal unit 8 is arranged in the vicinity of the stretch roller 22 on the side of the second operation unit 4.

When the air filter 2 is supplied from the first operation unit 3 to the inlet/outlet 301, 302, and the used air filter 2 is collected in the second operation unit 4, the dirt removal unit 8 arranged on the side of the second operation unit 4 can remove the dirt adhered to the used air filter 2. When the air filter 2 is supplied from the second operation unit 4 to the inlet/outlet 301, 302, and the used air filter 2 is collected in the first operation unit 3, the dirt removal unit 8 arranged on the side of the first operation unit 3 can remove the dirt adhered to the used air filter 2.

In the present embodiment, when the first determination unit 11 determines, based on the detection signal of the remaining amount detection sensor 5 or 6, that the air filter 2 (the unused air filter 2 or the used air filter 2) in the first operation unit 3 or the second operation unit 4 is about to run out or runs out, the control unit 10 controls the drive of the motor 32 of the first operation unit 3 and the drive of the motor 42 of the second operation unit so as to switch the transport direction of the air filter 2 to the opposite direction. In this way, as shown in FIG. 6, the used air filter 2 is transported from the second operation unit 4 toward the inlet/outlet 301, 302 so as to be reused.

Since the dirt adhered to the used air filter 2 which is supplied to the inlet/outlet 301, 302 is previously removed with the dirt removal unit 8 on the side of the second operation unit 4, a reduction in the performance of the filter is low. Hence, in the air filter device 1B of the present embodiment, as in the air filter device 1A, it is possible not only to maintain the constant performance of the filter over a long period of time but also to reuse the used air filter 2. The used air filter 2 is reused, and thus it is possible to further reduce the frequency of replacement of the air filter 2.

The dirt adhered to the reused air filter 2 after being reused in the inlet/outlet 301, 302 is removed again with the dirt removal unit 8 on the side of the first operation unit 3 when the air filter 2 is collected in the first operation unit 3. Hence, the air filter 2 may be reciprocated not only once (reused once) between the first operation unit 3 and the second operation unit 4 but also a plurality of times (reused a plurality of times).

Figure 7:
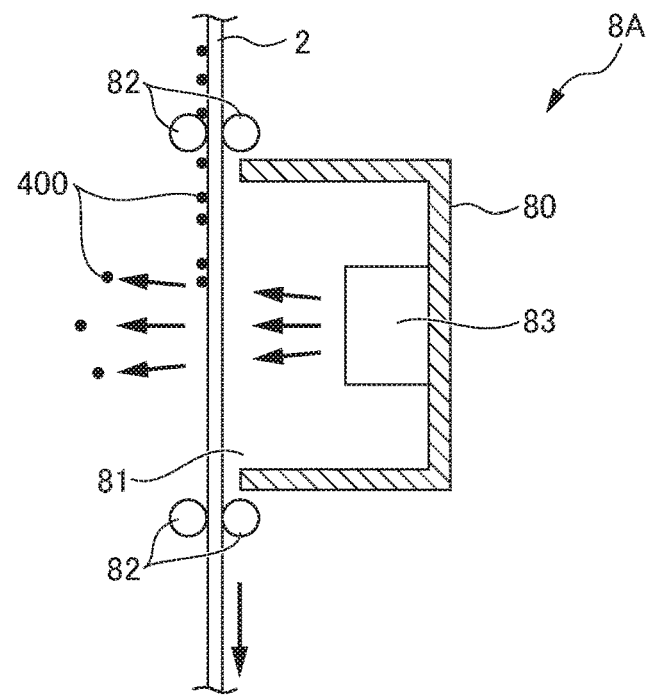
FIG. 7 is a diagram showing an embodiment of a dirt removal unit.

A specific embodiment of the dirt removal unit 8 will then be described. FIG. 7 is a diagram showing an embodiment of the dirt removal unit. The dirt removal unit 8A shown in FIG. 7 blows high pressure air to the air filter 2 and thereby blows away dirt 400 adhered to the air filter 2 so as to remove the dirt 400.

The dirt removal unit 8A includes an air blowing nozzle 83 within a housing 80 that is arranged on the side of a surface opposite to the surface to which the dirt 400 of the air filter 2 is adhered. The opening 81 of the housing 80 is arranged close to the surface opposite to the surface to which the dirt 400 of the air filter 2 is adhered. On each of an upstream side and a downstream side in the transport direction of the air filter 2 in the vicinity of the housing 80, a pair of rollers 82 between which the air filter 2 is sandwiched are arranged. The dirt removal unit 8A jets the high pressure air with the air blowing nozzle 83 from the back side of the surface to which the dirt 400 of the used air filter 2 sandwiched between the rollers 82 is adhered, and blows away the dirt 400 so as to remove the dirt 400. Although not shown in FIG. 5, the drive of the air blowing nozzle 83 is controlled by the control unit 10.

In order to facilitate the removal of the dirt 400 of the air filter 2, in the dirt removal unit 8A, a vibration provision device or the like (unillustrated) for easily blowing away the dirt 400 by providing vibrations to the air filter 2 may be added.

Figure 8:
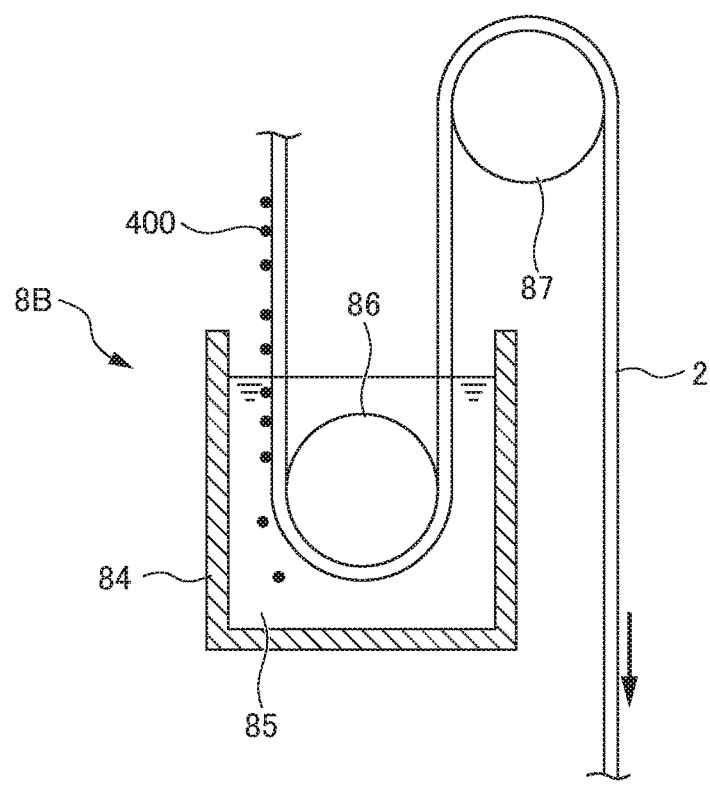
FIG. 8 is a diagram showing another embodiment of the dirt removal unit.

FIG. 8 is a diagram showing another embodiment of the dirt removal unit. In the dirt removal unit 8B shown in FIG. 8, the used air filter 2 is immersed in a cleaning fluid 85, and thus the dirt 400 adhered to the used air filter 2 is washed off so as to be removed.

The dirt removal unit 8B includes a cleaning chamber 84 in which the cleaning fluid 85 is stored. A driven roller 86 is arranged within the cleaning chamber 84. The used air filter 2 which is transported toward the dirt removal unit 8B is immersed in the cleaning fluid 85 when is passed through the driven roller 86 within the cleaning chamber 84. In this way, the dirt 400 is washed off so as to be removed from the air filter 2. The air filter 2 from which the dirt 400 has been removed is transported from the dirt removal unit 8B to the outside through a driven roller 87 arranged above the cleaning chamber 84.

The number of driven rollers 86 within the cleaning chamber 84 is not limited to one, and a plurality of driven roller 86 may be provided. The air filter 2 is stretched over a plurality of driven rollers within the cleaning chamber 84, and thus the air filter 2 can be immersed in the cleaning fluid 85 over a longer distance or a longer time, with the result that it is possible to enhance the effect of removing the dirt 400.

In the dirt removal unit 8B, in order to facilitate the removal of the dirt 400 of the air filter 2, a rotation brush which rubs the surface of the air filter 2 so as to scrape off the dirt 400, a nozzle which jets the water flow of the cleaning fluid 85 to the surface of the air filter 2 so as to separate the dirt 400, an ultrasonic generator which applies ultrasound to the surface of the air filter 2 so as to separate the dirt 400 or the like (unillustrated) may be added.

As the dirt removal units 8 at the two places provided in the air filter device 1B, either of the dirt removal units 8A and 8B may be used or, for example, the dirt removal unit 8A may be used as one of the dirt removal units 8 in the air filter device 1B and the dirt removal unit 8B may be used as the other dirt removal unit 8. Furthermore, the dirt removal units 8 at the two places provided in the air filter device 1B may be respectively formed with the two types of dirt removal units 8A and 8B.

Figure 9:
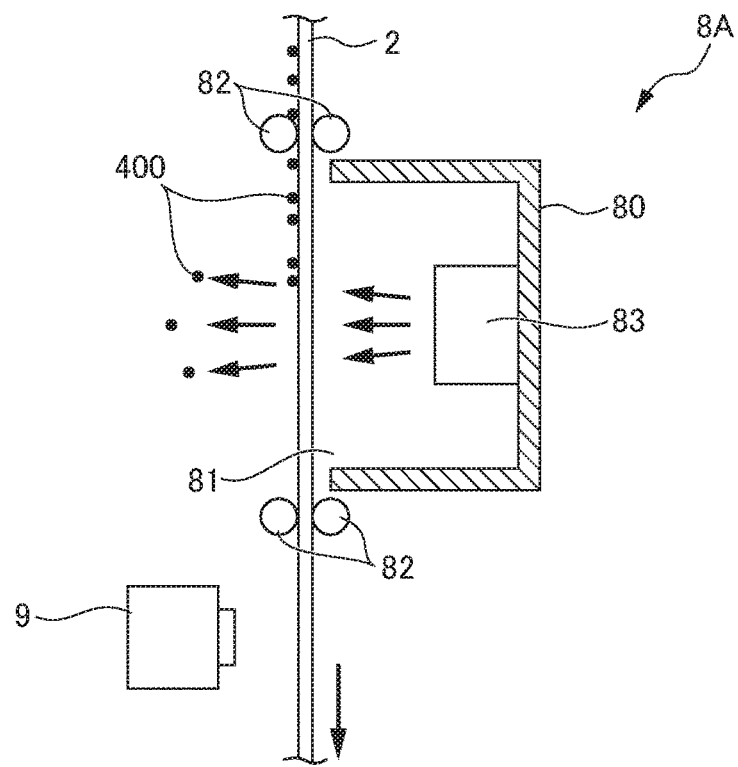
FIG. 9 is a diagram showing an inspection unit which inspects the state of dirt on the surface of the air filter.
Figure 10:
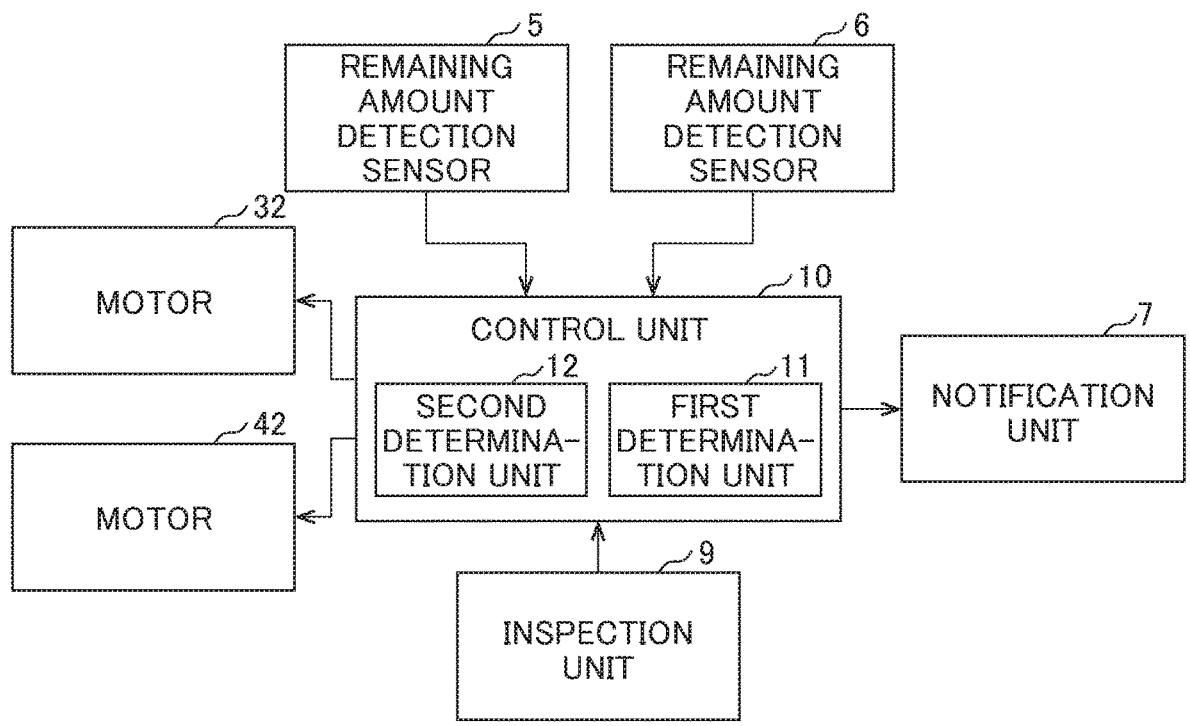
FIG. 10 is a block diagram showing an example of the configuration of an air filter device including the inspection unit.

When the dirt of the used air filter 2 is removed with the dirt removal unit 8, an inspection unit 9 may be provided which uses a sensor to inspect the state of the dirt of the used air filter after the dirt is removed. The configuration of the inspection unit 9 will be described with reference to FIGS. 9 and 10. FIG. 9 is a diagram showing the inspection unit which inspects the state of the dirt on the surface of the air filter. FIG. 10 is a block diagram showing an example of the configuration of an air filter device including the inspection unit.

There is no limitation to the specific configuration of the inspection unit 9 as long as it is possible to detect the state of the dirt of the air filter 2. Examples thereof include a configuration in which an image of the state of the dirt on the surface of the air filter 2 is recognized with a camera (image sensor), a configuration in which air is blown so as to pass through the air filter 2 and in which a pressure difference between both sides of the air filter 2 at that time is used so as to detect the state of the dirt of the air filter 2 with an anemometer (wind sensor) and the like. FIG. 9 illustrates the inspection unit 9 which recognizes an image of the state of the dirt on the surface of the air filter 2 with the camera.

The inspection unit 9 is arranged on the downstream side of the dirt removal unit 8 along the transport direction of the air filter 2. Hence, when as shown in FIG. 4, the dirt removal units 8 at the two places are provided, the inspection unit 9 is arranged between the dirt removal unit 8 on the side of the first operation unit 3 and the first operation unit 3, and the inspection unit 9 is arranged between the dirt removal unit 8 on the side of the second operation unit 4 and the second operation unit 4. As shown in FIG. 10, the result of an inspection performed with the inspection unit 9 is fed to the control unit 10.

As shown in FIG. 10, the air filter device 1B which includes the inspection unit 9 further includes a second determination unit 12 in the control unit 10. The second determination unit 12 inputs the result of the inspection (inspection value) performed with the inspection unit 9, compares it with a present state of the dirt (specified value) and determines whether or not the inspection value exceeds the specified value, that is, whether or not the state of the dirt of the air filter 2 exceeds the preset state of the dirt.

Figure 11:
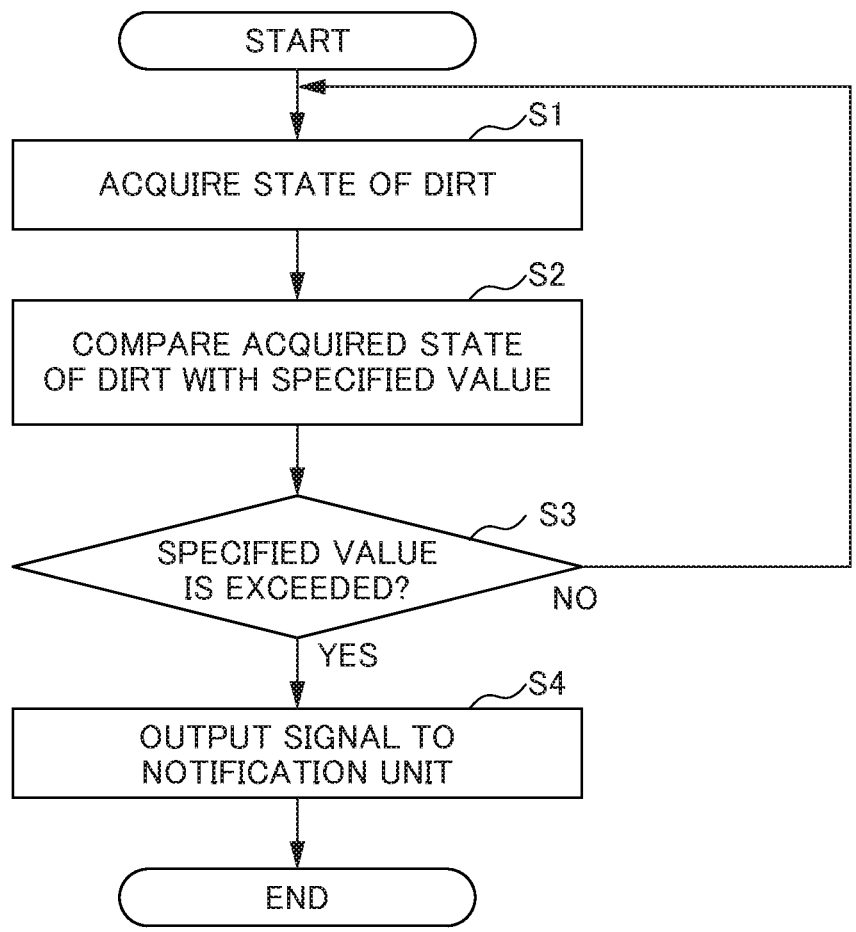
FIG. 11 is a flowchart showing an example of the control of the air filter device including the inspection unit.

An example of the specific control of the air filter device 1B including the inspection unit 9 will be described with reference to FIG. 11. FIG. 11 is a flowchart showing the example of the control of the air filter device including the inspection unit. In the control shown in FIG. 11, the control unit 10 acquires, at predetermined control intervals or with predetermined timing, the inspection value indicating the state of the dirt of the air filter 2 from the inspection unit 9 (step S1).

The control unit 10 compares, in the second determination unit 12, the acquired inspection value indicating the state of the dirt with the specified value (step S2) so as to determine whether or not the inspection value exceeds the specified value (step S3). When as a result of the determination, the inspection value does not exceed the specified value (when the determination is no in step S3), the process from step S1 is repeated. On the other hand, when as a result of the determination, the inspection value exceeds the specified value (when the determination is yes in step S3), it is determined that even when the dirt removal unit 8 is used, the dirt removal unit 8 cannot sufficiently remove the dirt of the air filter 2. In this case, the control unit 10 outputs, to the notification unit 7, the signal for notifying the necessity of replacement of the air filter. By the output of the signal from the control unit 10, the notification unit 7 notifies the operator of the necessity of replacement of the air filter 2. After the output of the signal to the notification unit 7, the control unit 10 stops the process until the replacement of the air filter 2 is completed.

As described above, the inspection unit 9 is provided that inspects the state of the dirt of the air filter 2 in which the dirt has been removed with the dirt removal unit 8, and thus it is possible to prevent the continuous use of the air filter 2 to which the dirt exceeding the specified value is adhered, with the result that it is possible to previously prevent a reduction in the performance of the filter caused by the continuous use of the dirty air filter 2.

Figure 12:
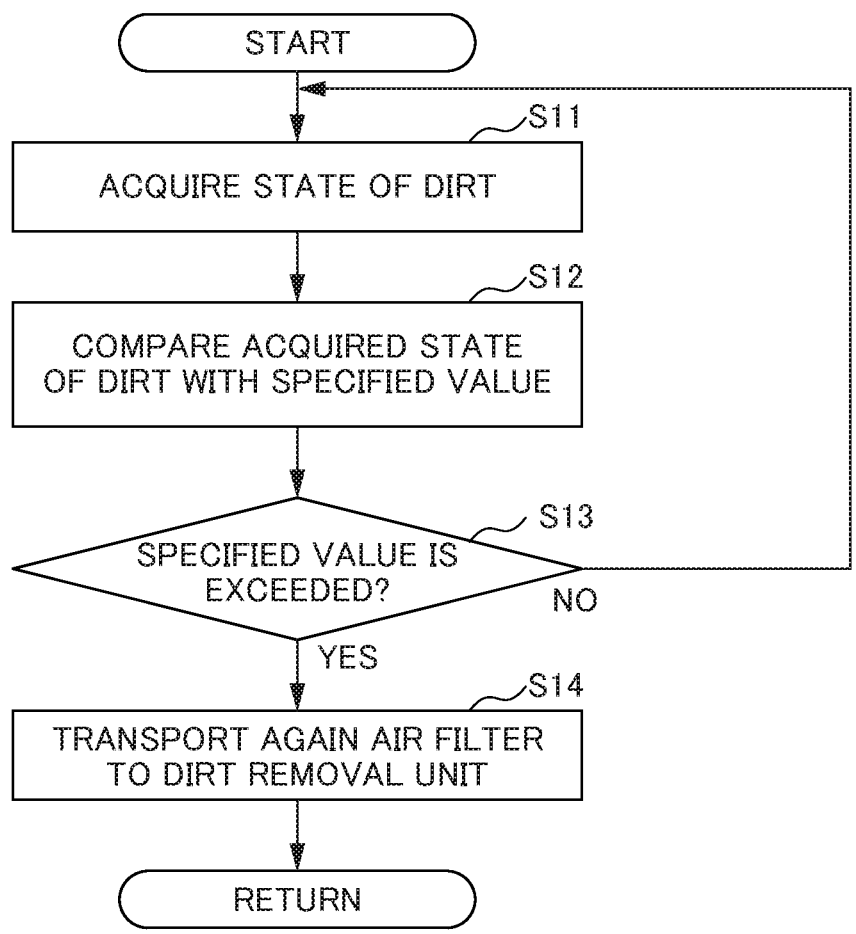
FIG. 12 is a flowchart showing another example of the control of the air filter device including the inspection unit.

FIG. 12 is a flowchart showing another example of the control of the air filter device including the inspection unit. In the flow shown in FIG. 12, a flow from step S11 to step S13 is the same as the flow from step S1 to step S3 shown in FIG. 11, and thus the description thereof will be omitted.

When in the control shown in FIG. 12, as a result of the determination in step S13, the inspection value exceeds the specified value (when the determination is yes in step S13), the control unit 10 switches the transport direction of the air filter 2 to the opposite direction, and thus the used air filter 2 in which the dirt has been removed with the dirt removal unit 8 is transported again toward the dirt removal unit 8 (step S14).

For example, when as shown in FIG. 4, the air filter 2 is transported by the rotation drive of the motor 42 in the second operation unit 4 from the first operation unit 3 toward the second operation unit 4, and the dirt of the used air filter 2 is removed with the dirt removal unit 8 on the side of the second operation unit 4, the control unit 10 stops the rotation drive of the motor 42 in the second operation unit 4 and drives and rotates the motor 32 in the first operation unit 3 so as to switch the transport direction of the air filter 2 to the opposite direction. In this way, the used air filter 2 after being passed through the dirt removal unit 8 on the side of the second operation unit 4 is transported again to the dirt removal unit 8, and thus the dirt is removed again.

After the air filter 2 is transported again to the dirt removal unit 8, the process is returned. The transport direction of the air filter 2 which is transported again to the dirt removal unit 8 is returned to the original direction with appropriate timing such as with timing at which a predetermined time elapses or with timing at which the dirt removal operation in the dirt removal unit 8 is completed.

As described above, when the inspection value obtained with the inspection unit 9 exceeds the specified value, the air filter 2 is transported again to the dirt removal unit 8 such that the dirt is removed, and thus it is possible to prevent the continuous use of the air filter 2 in which the removal of the dirt is not sufficient. In this way, it is possible to avoid a reduction in the performance of the filter caused by the continuous use of the dirty air filter 2, and it is also possible to enhance the degree of restoration of the air filter 2 by removing the dirt again, with the result that it is possible to further reduce the frequency of replacement of the air filter.

The transport of the air filter 2 to the dirt removal unit 8 again may be repeated a plurality of times. After the air filter 2 is transported again to the dirt removal unit 8, the inspection may be performed again with the inspection unit 9. When as a result of the inspection performed again, it is determined that the inspection value still exceeds the specified value, the control unit 10 may output, to the notification unit 7, the signal for notifying the necessity of replacement of the air filter.

Figure 13:
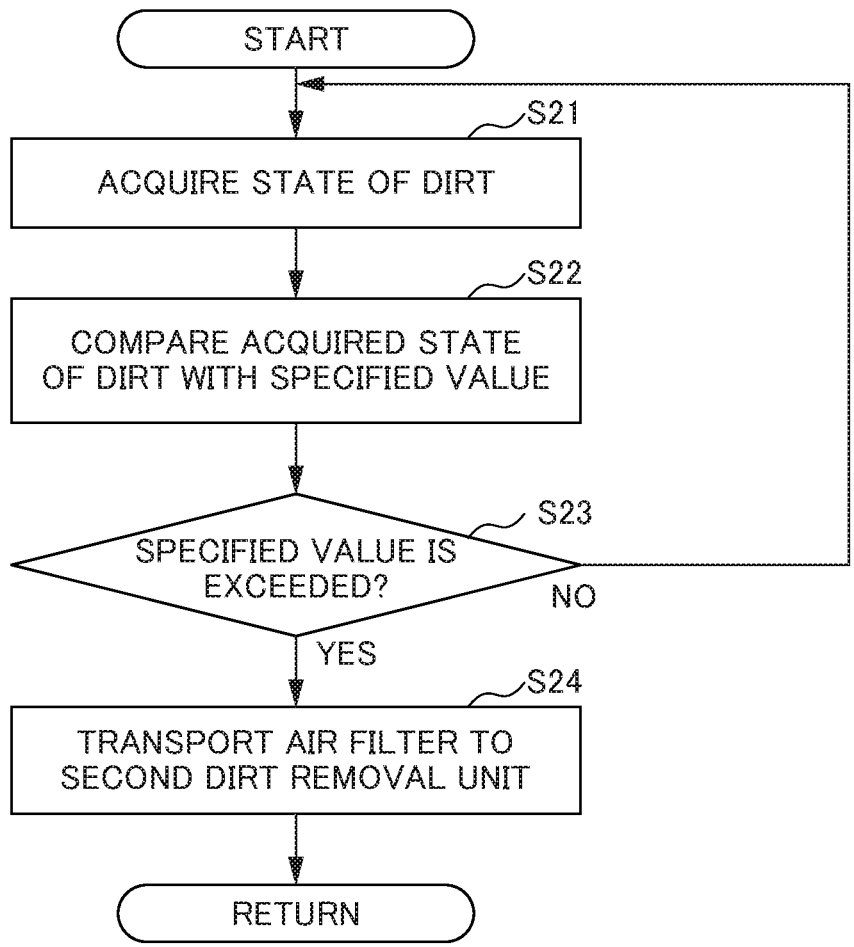
FIG. 13 is a flowchart showing yet another example of the control of the air filter device including the inspection unit.

FIG. 13 is a flowchart showing yet another example of the control of the air filter device including the inspection unit. In the control shown in FIG. 13, a flow from step S21 to step S23 is the same as the flow from step S1 to step S3 in the control shown in FIG. 11, and thus the description thereof will be omitted.

When in the control shown in FIG. 13, as a result of the determination in step S23, the inspection value exceeds the specified value (when the determination is yes in step S23), the control unit 10 transports the air filter 2 to a second dirt removal unit in order to perform dirt removal on the used air filter 2 by a method different from that of a dirt removal unit (first dirt removal unit) before the inspection (step S24).

Figure 14:
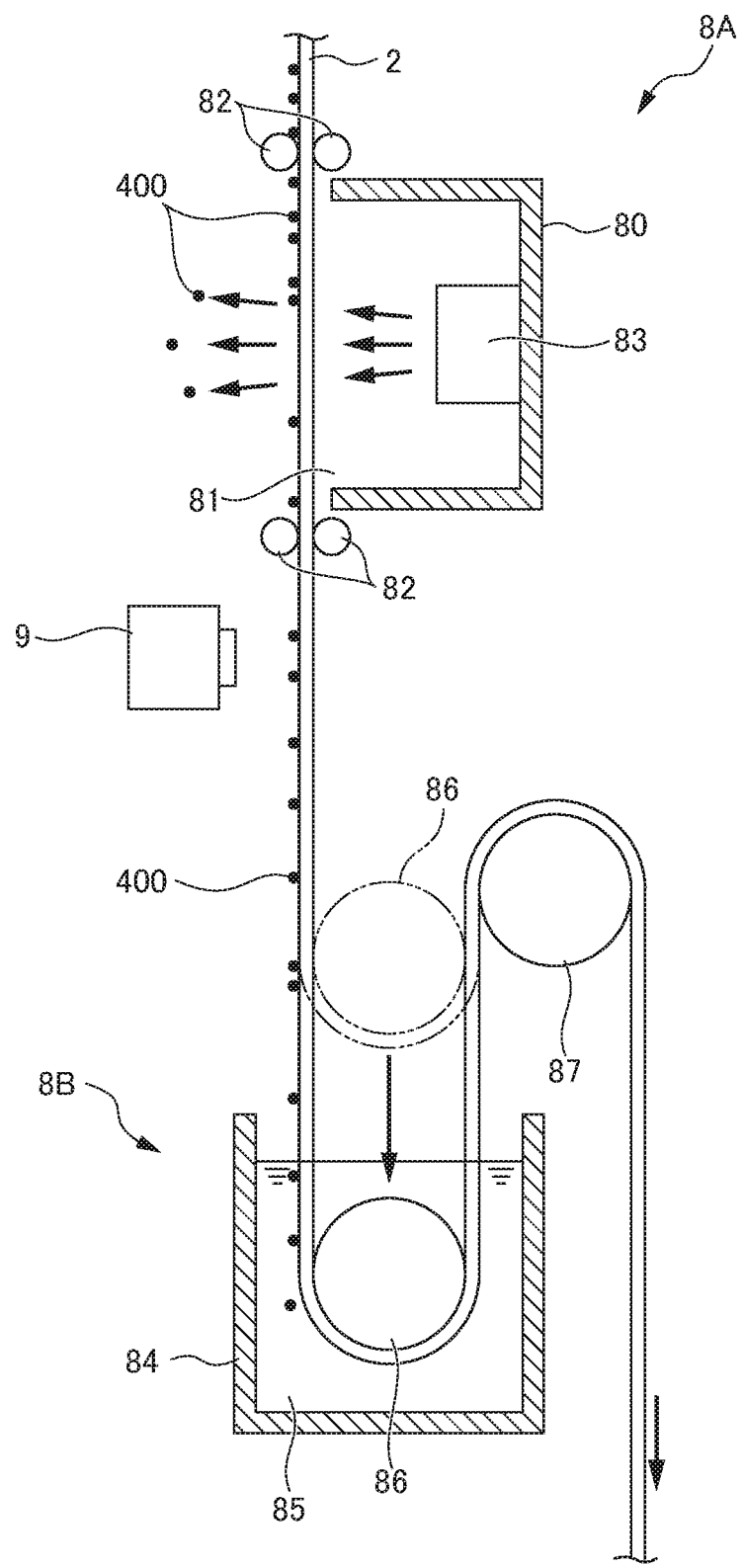
FIG. 14 is a diagram showing an embodiment of a dirty removal unit which includes a first dirt removal unit and a second dirt removal unit.

Here, an example of the first dirt removal unit and the second dirt removal unit will be described with reference to FIG. 14. FIG. 14 is a diagram showing an embodiment of a dirty removal unit which includes the first dirt removal unit and the second dirt removal unit. FIG. 14 shows a case where the first dirt removal unit is formed with the dirt removal unit 8A shown in FIG. 7 and where the second dirt removal unit is formed with the dirt removal unit 8B shown in FIG. 8.

When the air filter 2 is transported from above to below in FIG. 14, the dirt removal unit 8B serving as the second dirt removal unit is arranged on the downstream side along the transport direction of the air filter 2 with respect to the dirt removal unit 8A serving as the first dirt removal unit. The inspection unit 9 which inspects the state of the dirt of the air filter 2 is arranged between the dirt removal unit 8A and the dirt removal unit 8B. In the dirt removal unit 8B, the driven roller 86 can be moved between a first position (position indicated by a solid line in FIG. 14) in which the driven roller 86 is immersed in the cleaning fluid 85 within the cleaning chamber 84 with an unillustrated movement mechanism and a second position (position indicated by a chain double-dashed line in FIG. 14) in which the driven roller 86 is arranged outside the cleaning chamber 84. The drive of the movement mechanism is controlled by the control unit 10.

When the dirt removal unit 8A is used as the dirt removal unit at the time of a normal operation, the driven roller 86 of the dirt removal unit 8B is arranged in the second position. Hence, the used air filter 2 is passed through only the dirt removal unit 8A such that the dirt is removed, and is not immersed in the cleaning fluid 85 of the dirt removal unit 8B. However, when in step S23 shown in FIG. 13, it is determined that the inspection value exceeds the specified value, in step S24, the control unit 10 moves the driven roller 86 to the first position. In this way, the transport path of the used air filter 2 is switched, and thus the used air filter 2 is passed through the driven roller 86 so as to be immersed in the cleaning fluid 85 of the dirt removal unit 8B.

When as described above, the inspection value obtained with the inspection unit 9 exceeds the specified value, the air filter 2 is transported to the second dirt removal unit such that the dirt is removed by the method different from that of the first dirt removal unit, and thus the effect of removing the dirt is enhanced, with the result that it is possible to avoid a reduction in the performance of the filter caused by the continuous use of the dirty air filter 2. The dirt adhered to the air filter 2 is removed in at least two stages, and thus it is possible to further enhance the degree of restoration of the air filter 2.

On the downstream side of the second dirt removal unit (for example, the dirt removal unit 8B), an inspection unit (second inspection unit) for inspecting again the state of the dirt of the air filter 2 with a sensor may be arranged. When as a result of the inspection performed again, the inspection value still exceeds the specified value, the control unit 10 may perform control such that the air filter 2 is transported again to the dirt removal units 8A and 8B and that thus the dirt is removed again or may output, to the notification unit 7, the signal for notifying the necessity of replacement of the air filter.

Figure 15:
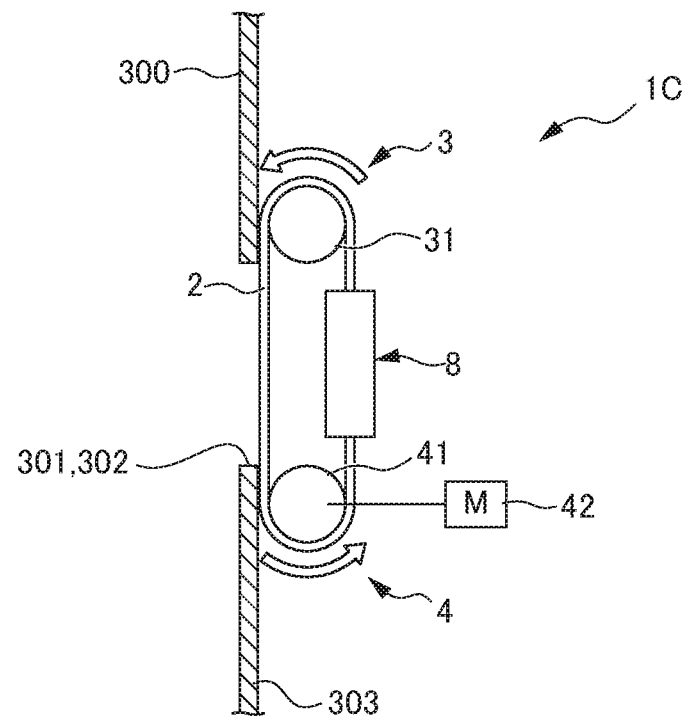
FIG. 15 is a diagram showing yet another embodiment of the air filter device of the industrial machine.
Figure 16:
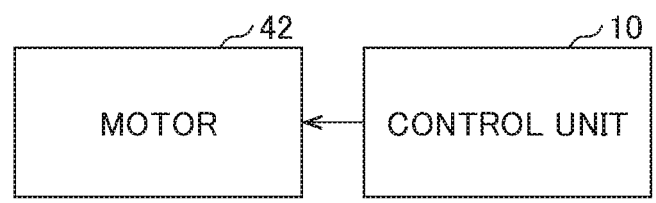
FIG. 16 is a block diagram showing an example of the configuration of the air filter device of the industrial machine shown in FIG. 15.

FIG. 15 is a diagram showing yet another embodiment of the air filter device of the industrial machine. FIG. 16 is a block diagram showing an example of the configuration of the air filter device of the industrial machine shown in FIG. 15. The air filter device 1C of the present embodiment differs from the air filter device 1B shown in FIG. 4 in that the air filter 2 is formed in an endless shape, that the air filter 2 is stretched over the rotation axis 31 of the first operation unit 3 and the rotation axis 41 of the second operation unit 4, that the remaining amount detection sensor is not included and that the dirt removal unit 8 is provided at only one place.

In the air filter device 1C, the motor 42 is driven to rotate, and thus the rotation axis 41 of the second operation unit 4 is rotated in the counterclockwise direction of FIG. 15 so as to transport the endless air filter 2 in the counterclockwise direction. In this case, the rotation axis 31 of the first operation unit 3 follows the rotation of the rotation axis 41 of the second operation unit 4 so as to rotate in the counterclockwise direction. Hence, the air filter 2 is transported from the first operation unit 3 to the inlet/outlet 301, 302 so as to be used, is thereafter collected in the second operation unit 4 and is further transported toward the first operation unit 3 without being passed through the inlet/outlet 301, 302. The transport of the endless air filter 2 is also performed continuously or intermittently (regularly).

The dirt removal unit 8 is arranged on a transport path in which the used air filter 2 after being used in the inlet/outlet 301, 302 is moved from the second operation unit 4 toward the first operation unit 3. Hence, the dirt adhered to the used air filter 2 which is collected in the second operation unit 4 and is transported toward the first operation unit 3 can be removed with the dirt removal unit 8. In this way, the air filter device 1C achieves the same effects as the air filter device 1B. Moreover, the air filter 2 is rotated in only one direction, and thus as shown in FIG. 16, the configuration of the control unit 10 is more simplified. Furthermore, the air filter 2 does not need to be wound around the rotation axes 31 and 41 in the shape of a roll, and thus only a small amount of air filter 2 is used.

The endless air filter 2 may be transported by the rotation of the rotation axis 31 in the first operation unit 3 with a motor. In this case, the rotation axis 41 of the second operation unit 4 follows the rotation of the rotation axis 31 in the first operation unit 3 so as to rotate. The transport direction of the air filter 2 is not limited to the counterclockwise direction of FIG. 15, and may be the clockwise direction.

In the air filter device 1C, the same inspection unit as the inspection unit 9 shown in FIG. 9 may be provided. In this case, as shown in FIG. 10, the second determination unit 12 and the notification unit 7 are further provided, and thus as in the air filter device 1B, according to the result of the inspection performed with the inspection unit 9, the notification unit 7 can notify the necessity of replacement of the air filter, the air filter 2 can be transported again to the dirt removal unit 8 or the air filter 2 can be transported to the second dirt removal unit.

Figure 17:
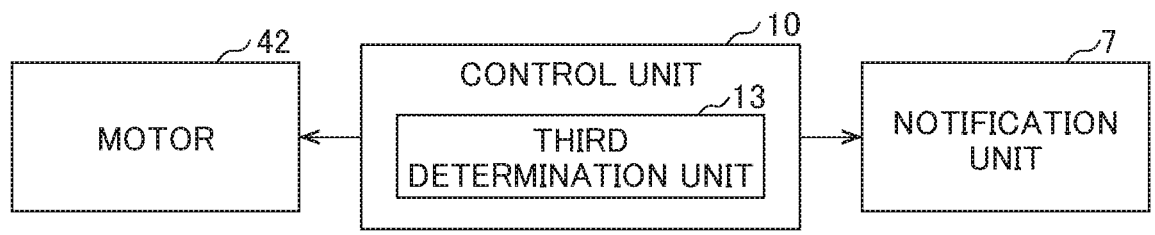
FIG. 17 is a block diagram showing an example of the configuration of an air filter device which can notify the necessity of replacement of the air filter.
Figure 18:
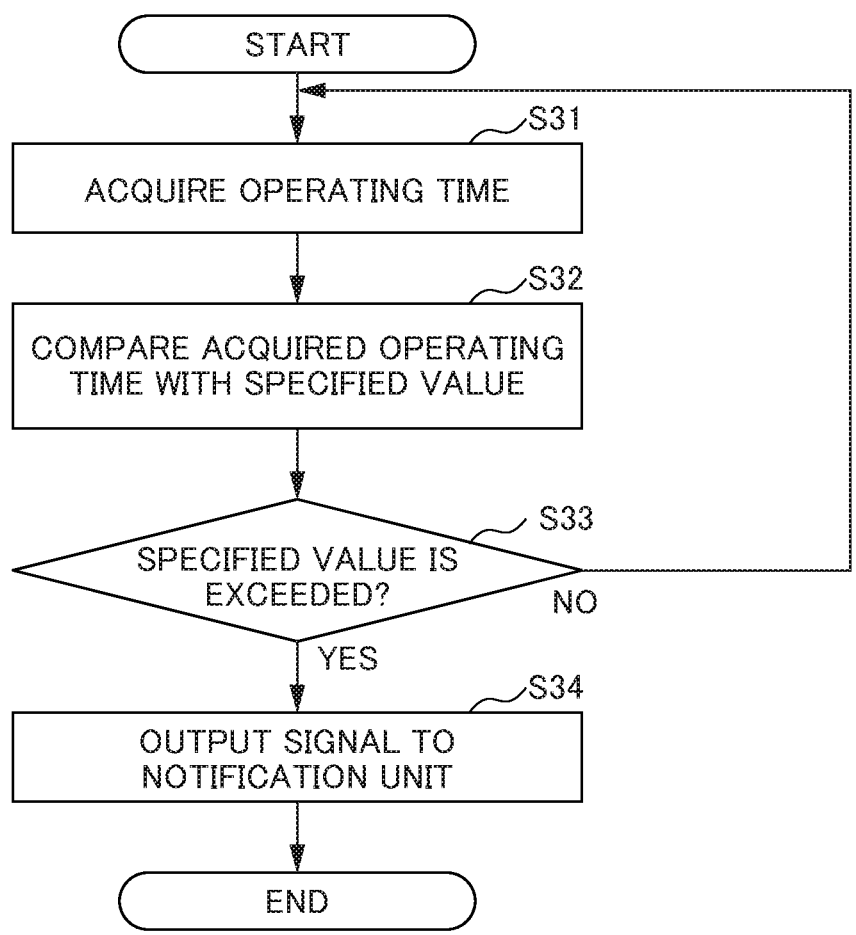
FIG. 18 is a flowchart showing an example of the control of the air filter device shown in FIG. 17.

A configuration may be adopted in which the air filter device 1C can notify the necessity of replacement of the air filter 2 regardless of the result of the inspection performed with the inspection unit 9. FIG. 17 is a block diagram showing an example of the configuration of the air filter device which can notify the necessity of replacement of the air filter. FIG. 18 is a flowchart showing an example of the control of the air filter device shown in FIG. 17.

In the air filter device 1C in this case, as shown in FIG. 17, a third determination unit 13 is provided in the control unit 10, and the notification unit 7 is provided. The third determination unit 13 monitors the operating time of the industrial machine including the air filter device 1C so as to determine whether or not the operating time of the industrial machine exceeds a preset operating time. The operating time of the industrial machine can be acquired from the motor drive device 101.

In the control shown in FIG. 18, the control unit 10 acquires, at predetermined control intervals or with predetermined timing, an operating time after the start of the operation of the industrial machine from the motor drive device 101 (step S31). The control unit 10 compares, in the third determination unit 13, the acquired operating time with the specified value of the preset operating time (step S32) so as to determine whether or not the acquired operating time exceeds the specified value (step S33). When as a result of the determination, the acquired operating time does not exceed the specified value (when the determination is no in step S33), the process from step S31 is repeated. On the other hand, when as a result of the determination, the inspection value exceeds the specified value (when the determination is yes in step S33), the control unit 10 determines that the air filter 2 needs to be replaced so as to output, to the notification unit 7, the signal for notifying the necessity of replacement of the air filter. By the output of the signal from the control unit 10, the notification unit 7 notifies the operator of the necessity of replacement of the air filter 2. After the output of the signal to the notification unit 7, the control unit 10 stops the process until the replacement of the air filter 2 is completed.

In this way, since the timing with which the endless air filter 2 is replaced can be notified to the operator, it is possible to avoid a reduction in the performance of the filter caused by the continuous use of the air filter 2 in which the degree of the dirt is increased by the repeated use or the deteriorated air filter 2. The third determination unit 13 can also be provided in the air filter device 1B.

In each of the embodiments described above, the control unit 10 can be installed as a constituent part dedicated for the air filter device within the cover 300 shown in FIG. 1. However, the control unit 10 may be formed with the motor drive device 101 installed within the power magnetics cabinet 100. When the control unit 10 is formed with the motor drive device 101, the drive of the industrial machine can be linked to the drive of the air filter device 1. For example, when the control unit 10 outputs the signal for notifying the necessity of replacement of the air filter, the motor drive device 101 can perform, for example, control so as to be able to stop, by the output of the signal, the drive of the motor of the industrial machine and to temporarily stop the drive of the industrial machine until the replacement of the air filter 2 is completed.

In the air filter devices 1A and 1B, the shape of the air filter 2 is not limited to the shape of a roll, and the air filter 2 may be folded in the shape of a bellows. In this case, the first operation unit 3 and the second operation unit 4 supply the air filter 2 to the inlet/outlet 301, 302 while unfolding the air filter 2 folded in the shape of a bellows, and the used air filter 2 which has been used in the inlet/outlet 301, 302 is collected while being folded in the shape of a bellows.

EXPLANATION OF REFERENCE NUMERALS

1, 1A, 1B, 1C air filter device
2 air filter
3 first operation unit
4 second operation unit
8, 8A, 8B dirt removal unit
9 inspection unit
10 control unit
11 first determination unit
12 second determination unit
13 third determination unit
101 motor drive device
301 inlet (filtered portion)
302 outlet (filtered portion

What is claimed is:

1. An air filter device of an industrial machine, the air filter device comprising:
    a filtered portion;
    an air filter that is arranged in the filtered portion;
    a first operation unit that includes a first rotation axis around which the air filter is wound and transports the air filter toward the filtered portion, the first operation unit including a first motor that drives rotation of the first operation unit;
    a second operation unit that includes a second rotation axis and collects the air filter transported from the first operation unit and used in the filtered portion on the second rotation axis, the second operation unit including a second motor that drives rotation of the second operation unit;
    a control unit configured to control drive of the first motor of the first operation unit and drive of the second motor of the second operation unit; and
    a dirt removal unit
    comprising a first dirt removal unit that includes an air blower and a second dirt removal unit that includes a cleaning chamber storing cleaning fluid to remove the dirt by a method different from a method of the first dirt removal unit, the air filter is transported to the first dirt removal unit,
    the air filter device further includes an inspection unit configured to inspect, with a sensor, a state of the dirt of the air filter after the dirt is removed with the first dirt removal unit,
    the control unit is configured to determine whether or not the state of the dirt of the air filter inspected with the inspection unit exceeds a preset state of the dirt, and
    the control unit is configured such that when it determines that the preset state of the dirt is exceeded, the control unit is configured to send a signal such that the air filter is transported to the second dirt removal unit.

2. The air filter device of the industrial machine according to claim 1,
    wherein the control unit is configured to determine whether or not the air filter in the first operation unit or the second operation unit is about to run out or runs out, and
    the control unit is configured such that when it determines that the air filter in the first operation unit or the second operation unit is about to run out or runs out, the control unit is configured to control the drive of the first operation unit and the second operation unit by stopping the operation of one of the first motor and the second motor and rotating the other of the first motor and the second motor so as to transport the air filter in an opposite direction.

3. The air filter device of the industrial machine according to claim 1,
    wherein the control unit is configured such that when it determines that the preset state of the dirt is exceeded, the control unit is configured to output a signal indicating that the air filter needs to be replaced and to stop operation of the air filter device.

4. The air filter device of the industrial machine according to claim 1, wherein the control unit is configured to determine whether or not an operating time preset in the industrial machine is exceeded, and
    wherein the control unit is configured such that when it determines that the operating time is exceeded, the control unit is configured to output a signal indicating that the air filter needs to be replaced and to stop operation of the air filter device.

5. The air filter device of the industrial machine according to claim 1, wherein the dirt removal unit removes dirt on a transport path of the air filter between the first operation unit and the filtered portion and dirt on a transport path of the air filter between the second operation unit and the filtered portion.

\* \* \* \* \*